(12) United States Patent
Willey

(10) Patent No.: US 7,387,328 B2
(45) Date of Patent: Jun. 17, 2008

(54) CYCLE WINDSHIELD

(76) Inventor: Barry A. Willey, 727 Ela Rd., Iverness, IL (US) 60067

( * ) Notice: Subject to any disclaimer, the term of this patent is extended or adjusted under 35 U.S.C. 154(b) by 119 days.

(21) Appl. No.: 11/470,666

(22) Filed: Sep. 7, 2006

(65) Prior Publication Data

US 2008/0061579 A1 Mar. 13, 2008

(51) Int. Cl.
*B62J 17/02* (2006.01)
(52) U.S. Cl. .................................................... 296/78.1
(58) Field of Classification Search ............... 296/78.1, 296/77.1
See application file for complete search history.

(56) References Cited

U.S. PATENT DOCUMENTS

| | | | | |
|---|---|---|---|---|
| 1,170,118 A | * | 2/1916 | Scott | 296/77.1 |
| 2,237,594 A | * | 4/1941 | Dunlap | 296/78.1 |
| 5,267,767 A | * | 12/1993 | Farrow | 296/78.1 |
| 5,275,067 A | * | 1/1994 | Lew | 74/551.1 |
| 5,730,483 A | * | 3/1998 | Greger | 296/78.1 |
| 5,785,374 A | * | 7/1998 | Aoki et al. | 296/78.1 |
| 5,788,313 A | * | 8/1998 | Willey | 296/78.1 |
| 6,588,529 B2 | * | 7/2003 | Ishii et al. | 180/219 |
| 6,619,415 B1 | * | 9/2003 | Hasumi et al. | 180/68.1 |
| 6,641,196 B1 | * | 11/2003 | Hanagan | 296/78.1 |
| 6,786,526 B1 | * | 9/2004 | Blalock | 296/77.1 |
| 7,007,998 B2 | * | 3/2006 | Toyofuku | 296/78.1 |
| 7,032,915 B2 | * | 4/2006 | Bedard et al. | 280/288.4 |
| 7,032,948 B2 | * | 4/2006 | Khan | 296/78.1 |
| 2005/0200153 A1 | * | 9/2005 | Khan | 296/78.1 |

* cited by examiner

*Primary Examiner*—H Gutman
(74) *Attorney, Agent, or Firm*—Vedder Price P.C.

(57) ABSTRACT

A windshield for a motorcycle, which when compared to other, earlier windshields, having a more upright profile and which also has a larger radius of curvature when viewed from the top, and a greater width towards the top as opposed to a shield having a tapering profile with a narrower portion at the top.

13 Claims, 3 Drawing Sheets

CYCLE WINDSHIELD

BACKGROUND OF THE INVENTION

The present invention relates to motorcycle windshields, and in particular, windshields which are designed to be used with riders who are seated generally upright on their motorcycles. Thus, the shield of the invention is not one which is primarily designed to be used with riders that are in the so-called crotch-rocket position, although the principles do apply. Basically, shields of the present invention have the object of moving windshield-caused turbulence farther from the rider's normal position. Hence, the ride is much more quiet and smoother than before.

The windshields of the present invention are primarily relatively upright, as befits a touring rider, and are surprisingly a bit wider across their upper portion, and preferably somewhat less wide below this area. These shields are made to increase rider comfort, not to reduce drag.

Moreover, the windshields of the present invention are formed with a critical curvature when viewed from the top. Still further, such windshields are preferably made from a windshield material which, in addition to other attributes, has a high index of refraction, such as polycarbonate. It has been found that windshields of the polycarbonate type are much more rugged, and provide a better optical result under most conditions, than motorcycle windshields which are made from Lucite™ or Plexiglas™, or in other words, an acrylic or polyacrylate windshield.

As motorcycle windshields have become larger, instead of becoming less curved when viewed from the top, they are becoming more curved, and thus they would tend to have a smaller radius of curvature. This trend has continued throughout the evolution of modern windshields, as such windshields are designed in pursuit of reduced aerodynamic drag.

When viewed from the side, such windshields have tended, in the apparent interest of better airflow and streamlining, to be raked more toward the rear, or less upright. When viewed from the front, such windshields almost invariably have started with the widest portion near the bottom, or the point at which they approach or join the handlebars, with the edges tapering towards each other and toward the top of the shield.

Consequently, such shields have not been, although arguably somewhat more streamlined, as comfortable as they might be, for the normally positioned rider or for the normally positioned rider and passenger. The wind flowing over such shields, particularly in the 50 to 90 mile per hour (MPH) regime, wherein most touring motorcycles are operated most often by the vast majority of riders, passes over and around the shield and gives rise to what is sometimes known as the von Karmann effect, or the air flow is said to give rise to a von Karmann Vortex or Von Karmann Vortices.

Such airflow, when viewed from the front of the cycle, generally spins in a clockwise or counterclockwise pattern, and such swirling flow impinges on the rider, and especially his ears, with a resultant loud noise and/or buffeting around his or her helmet. This is the normal position of the rider as he cruises along. This sensation or turbulence and noise is very uncomfortable, but is regarded by many riders are just an annoyance or discomfort to be tolerated. Furthermore, in an unrelated aspect, such riders are frequently glancing somewhat sideways through the viewing area of the shield, and they may be, for example, in this pursuit, looking for the edge markers on the road, or may be attempting to view speed limit or directional signs or the like.

In such case, the refractive index of the polycarbonate material, is such that the view is distorted when the shield is more sharply curved. This creates a false or even dangerous impression for the rider. Consequently, viewing through a sharply curved shield having a large index of refraction presents a distorted or misleading image, which is much more the case with the polycarbonate windshields than with the acrylic shields. However, as pointed out, particularly because of their durability, the polycarbonate shields are much more desirable.

Another aspect of prior art shields has been the tendency of larger touring motorcycles to have semi-retractable windshields, that is, windshields which in use travel a vertical distance of from two to six inches. An ideal windshield would be one which maintains good performance in any of its adjustable positions. This adjustability, however, does not successfully address the problem of buffeting and noisemaking.

It is therefore an object of the present invention to provide touring windshields which create greatly reduced noise and annoying air turbulence to the touring rider.

Another object of the invention is to provide windshields which, when viewed from the front, have an equal, a larger or wider extent toward the top of the shield, rather than a more narrow extent.

A still further object is to provide a windshield which has less curvature, i.e., a larger radius of curvature when viewed from the top than that of previous touring shields.

A still further object is to provide a shield which has a relatively constant radius of such curvature when viewed from the top.

A further object is to provide a motorcycle windshield which, when viewed from the side, has a somewhat more upright aspect, or is less inclined from the vertical than prior shields.

A still further object is to provide a windshield which may have an up and down adjustment of two to six inches, and which is therefore highly suitable for the rider of a touring-type motorcycle, with such adjustment having little effect on the windshield, provided the rider's head is properly positioned.

A further object of the invention is to provide a shield which will cause the so-called von Karmann vortices to be moved further back and sideways, and thus out of the way of the normally positioned rider, and which will therefore in turn be much more comfortable for such riders and passengers.

A further object is to provide a greatly improved replacement windshield for cycles with stock design windshields.

Another object of the present invention is to create a much less noisy environment for the rider, particularly for touring riders and passengers traveling at a rate between 50 miles per hour and 90 miles per hour.

A further object of the invention is to provide a shield having a unique shape in three dimensions.

A further object is to provide a more comfortable windshield in use, and especially a shield for touring motorcycles.

SUMMARY OF THE INVENTION

These and other objects and advantages of the present invention are achieved in practice by providing a shield having a relatively more upright position or stance than is conventional; by a shield having a larger radius of curvature throughout when viewed from the top, and which, when viewed from the front, has an enlarged upper aspect compared with its lower aspect, that is, a generally somewhat greater width toward the top, as a frontal aspect or a left-to-right dimension.

The exact manner in which the above and other inherent objects of the invention are achieved in practice will be more clearly apparent when reference is made to the following detailed description of the preferred embodiment of the invention set forth by way of example and shown in the accompanying drawings in which like reference numerals indicate corresponding parts throughout.

DESCRIPTION OF THE PREFERRED EMBODIMENTS OF THE INVENTION

Figure 1:
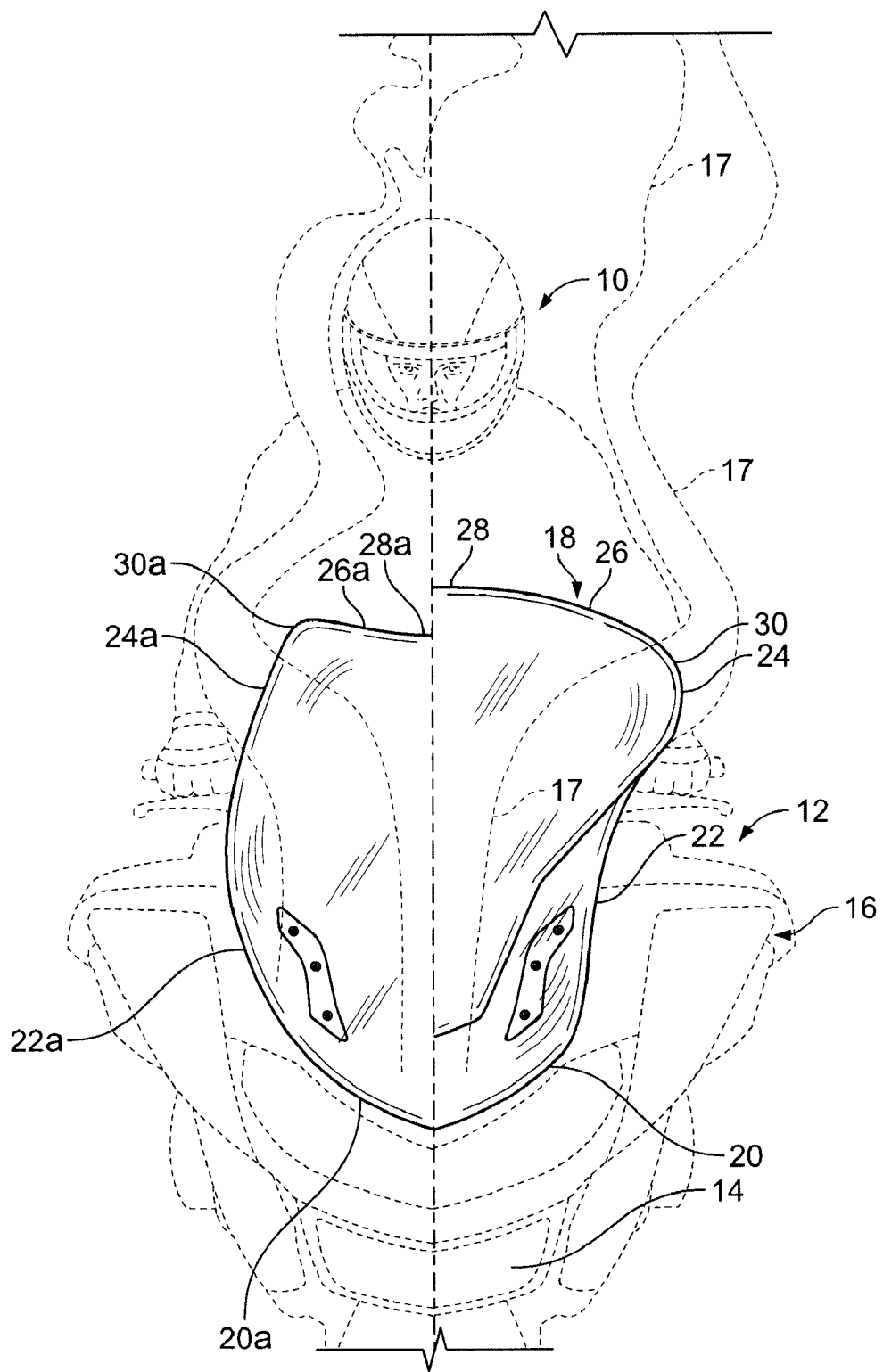
FIG. 1 is a front view, somewhat diagrammatic, schematically showing a half-shield and the associated airflow on the left side that is typical of the prior art, and also showing a half-shield according to the present invention on the right, schematically showing the greatly improved air flow from this half-shield.

While the invention may take forms other than those exactly described in detail herein, the main features can be gleaned from the following detailed description. Referring now to the drawings in greater detail, FIG. 1 includes phantom lines showing a rider generally designated 10 and a motorcycle generally designated 12 and shown to include the customary part such as a headlight 14, with or without other portions generally designated 16, constituting a lower part of a fairing or the like. This drawing also shows the airflow, generally designated 17, in phantom lines.

In any case, a windshield generally designated 18 is provided for the rider 10, and this shield includes a lower portion 20, an intermediate generally upright portion 22, portion of maximum width 24 and an upwardly and inwardly tapering surface 26 which becomes the highest point 28 at or near the middle of the shield 18.

A typical shield of the prior art 20a, when viewed from the front, includes a portion 20a which is similar to its counterpart 20 at the lowermost portion of shield. However, the portion 22a is a wider portion of the shield and extends somewhat laterally, whereas the other portion 22 necks somewhat inwardly at its central portion. The uppermost portion of the prior art shield 24a has a definite inward taper, and is narrower at 24a than at the intermediate portion 22a. In contrast, the uppermost section 24 of the inventive shield has the greatest width at 24.

The top surface 26A in the prior art is shown as actually sloping downwardly, thus having a considerably different shape than the rounded shape of the upper surface 26. As a result, the upper central portion in the prior art 28a dips down or is lower than the top curve of the portion 30a, whereas the counterpart surface 30 on the portion of FIG. 1 is shown to extend inwardly, but also upwardly.

Figure 2:
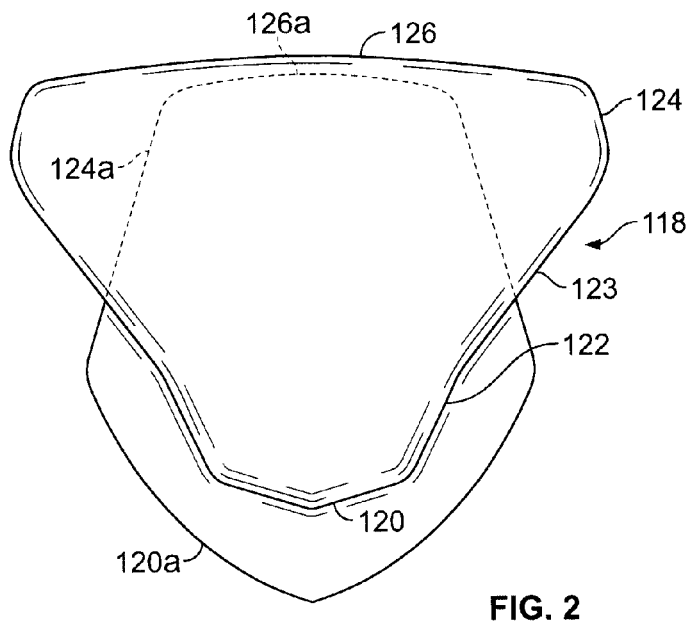
FIG. 2 is a front elevational view showing a replacement windshield of the present invention, having an increased width as the shield approaches the upper part or top, and showing the prior art configuration in dotted lines.

Referring now to FIG. 2, there is shown another embodiment of the invention which is somewhat the same as FIG. 1, with a few differences. In this embodiment, the lowermost portion of the shield 120 and the first upwardly extending part 122 are shown to be separated by a somewhat squared off angle. The intermediate portion of the shield 123 slopes upwardly and outwardly, terminating in a squared off portion 124. The uppermost portion 126 is generally somewhat the same as in the other embodiment, but is more angular than the other portion.

The counterpart shown in phantom line 120a includes a gradual curve as it extends upwardly, however, thereafter the prior art shield is shown to taper rather progressively inwardly at 124a, and its top or upper portion 126a is narrower than the portion 124. The overall width of the prior art shield reaches a maximum at a third to one-half its height, whereas the shield of the invention has maximum width at 124, near the top, where it is also considerably wider than the prior art shield.

Figure 3:
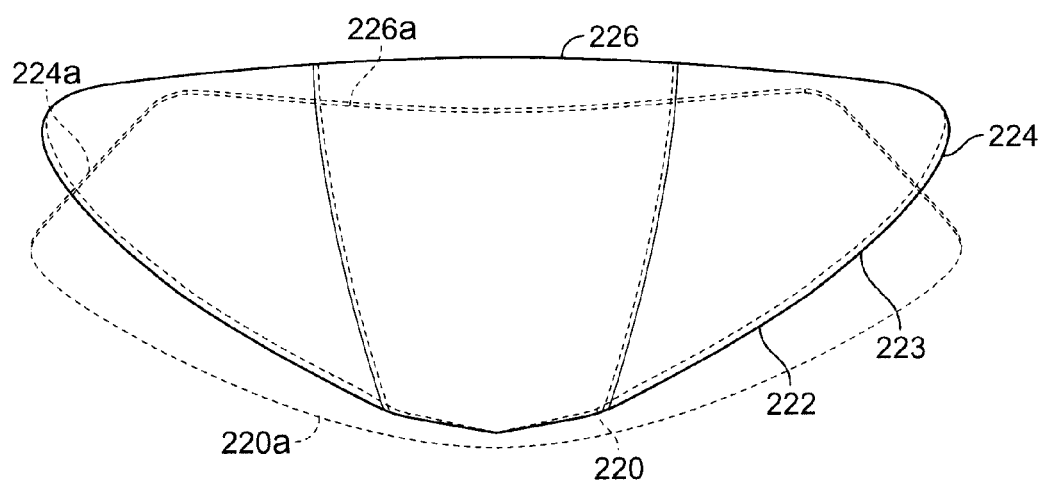
FIG. 3 is a partially schematic view of both shields taken from somewhat above and showing the old style in dotted lines and showing the new shield in solid lines, with the newer shield being slightly wider and having a different shaped profile.

FIG. 3 shows the same proportions, but segments 220, 222 and 223 are similar to their counterparts. The uppermost portion 224 is larger from front to bottom, but the topmost portion 226 is very similar to the other embodiment. The lower portion of the prior art 220a is shown as extending well outwardly until it reaches a peak and then tapers somewhat sharply inwardly as shown at 224a. Number 226a shows a somewhat downwardly extending top section rather than the upwardly extending top section of 226.

Figure 4:
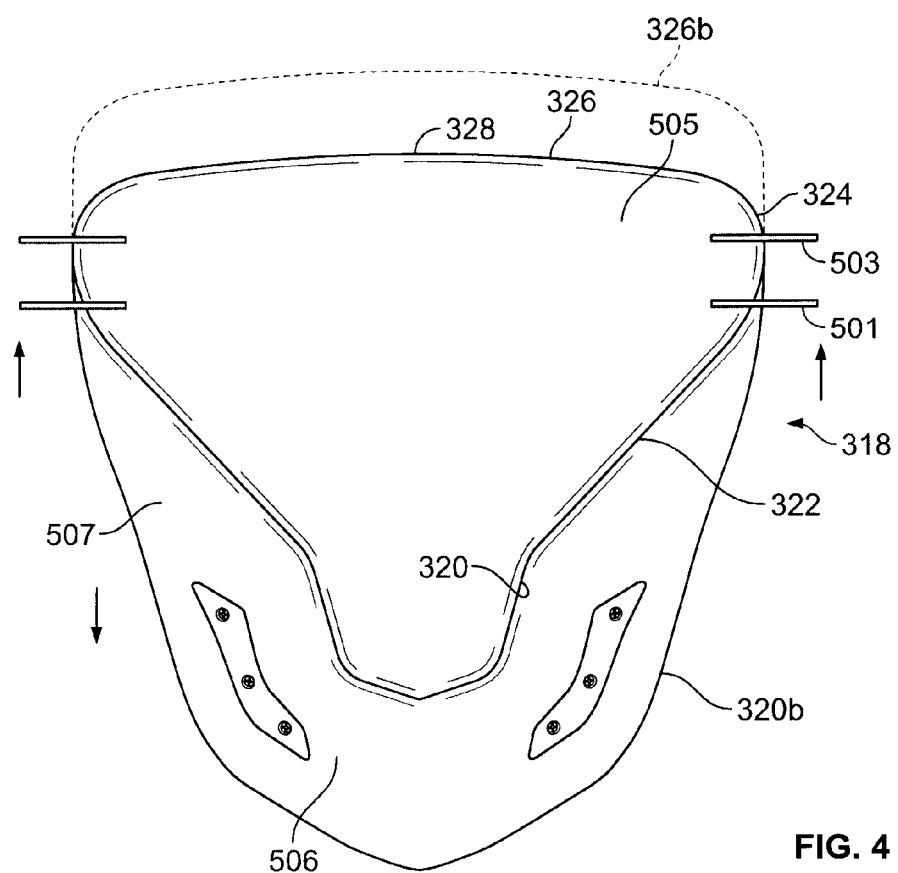
FIG. 4 is a front elevational view showing one embodiment of the shield of the invention, and showing its generally vertical movement as it undergoes adjustment.

Referring now to FIG. 4, there is shown an adjustable shield generally designated 318 which includes a lowermost portion 320, and intermediate portion 322, and maximum width portion 324, with an upper portion 326 terminating in the topmost portion 328. The dotted or phantom lines show the lowermost portion 320b and the uppermost portion 326b, etc. as identical to their counterparts but merely show that these portions are capable of moving up and down according to the desires of the rider. Typically, this movement is from three to six inches, but the amount of movement does not form a necessary part of the invention. It is only used to explain that this invention is useful with shields that are moved somewhat for adjustment, to take account of the size of the rider, the anticipated speed of the cycle, etc.

Figure 5:
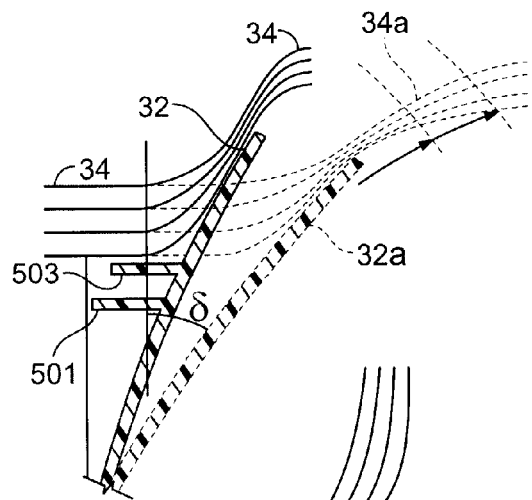
FIG. 5 is a vertical sectional view, showing a portion of the shield of the present invention in solid lines and the prior art shield in phantom lines, and showing the prior art on the right and the inventive shield on the left, and showing the air flow over both shields.

Referring now to FIG. 5, there is shown a fragmentary pair of the inventive and prior art windshields, 32, 32a in solid lines and in phantom lines, respectively. Also shown schematically is the air flow 34, 34a passing over these windshields. According to the invention, contrary to what would appear to be conventional wisdom, the shield 32 which is more upright, deflects the air 34 somewhat over the top of the shield as the lower shield 32a having a more inclined surface, deflects the air somewhat less but still over the top of most of the shield in both cases.

However, as can be seen from FIG. 5, a portion of the air which encounters the steeper shield is deflected around the edges of the shield, such as the portions 124. More of the slipstream thus extends around to the left and right of the shield rather than over the top as shown at 34a in FIG. 5. In FIG. 5, the flow of air 34a tends to go somewhat more over the top, but here it may depend on the rider, particularly a taller rider, when he is dealing with a more sloped or more inclined shield 32a.

Figure 6:
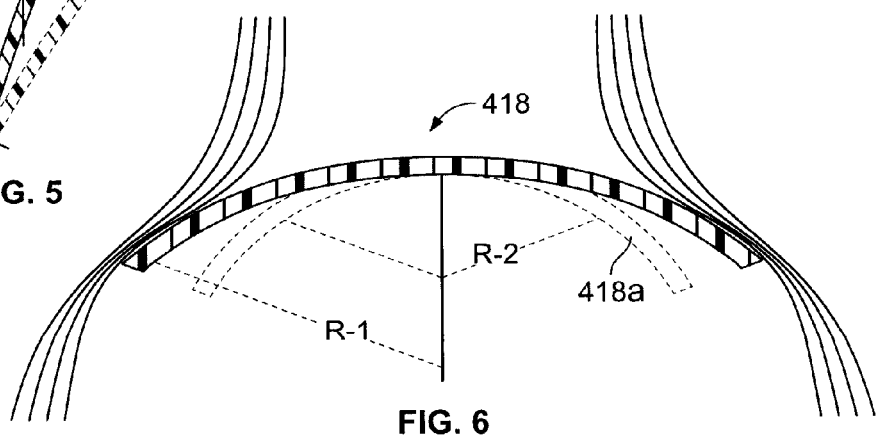
FIG. 6 is a horizontal sectional view showing the inventive shield in sold and a prior art shield in dotted lines.

Referring now to another feature of the invention, FIG. 6 shows in solid lines a shield generally designated 418, and in phantom lines a more curved more steeply rounded shield 418a. The shield of the invention 418 includes a larger radius of curvature R1 or less inclined shield, (viewed from the top), whereas the phantom line FIG. 418a has a smaller radius or a more inclined surface 418a. One purpose behind this contouring of the shield, is to lessen the impact of the higher refractive index of the material from which the shield is made. Thus, as pointed out above, the polycarbonate (Lexan) shield has a much greater, index of refraction than the acrylic (Plexiglas™ or Lucite™) windshield. Although both have optical clarity, the index of refraction of the polycarbonate is much greater, usually about 1.30.

Accordingly, the radius of curvature is most advantageous when it is 16 to 18 inches, whereas the radius R2 most or all of the prior art windshield is eight to ten inches. Consequently, when viewing something such as the side of the road, road signs, oncoming vehicles, etc., the shield with the greater index of refraction and greater amount of curvature, distorts the viewing to a much greater extent than if the windshield is relatively less curved. Hence, the form of the shield 418 is greatly preferred.

Referring again to FIG. 1, it has shown that the air flowing over the wider part of the shield tends to scroll to the right or left as it leaves the shield, and rolls either right or left, but this air is deflected more towards the shoulder of the rider or even past the shoulder than at the rider's helmet as shown on the left side of FIG. 1. These so-called von Karmann Vortexes or Vortices, are greatly disturbing and inconvenient to the riders and/or passengers on such touring motorcycles.

The user or rider thus has been found to greatly prefer a shield such as that shown on the right hand side of the drawing. At the target speeds of 50 to 90 miles per hour, such a rider is much more free from noise or buffeting associated with the prior art vortexes impinging on him and/or his passenger. On the other hand, left hand part of FIG. 1 shows that these vortices are not disturbed by the windshield or disturbed much less and consequently impinge on the rider's helmet. Consequently, he is subject to a very loud and disturbing noise level and buffeting throughout most or all of the 50 to 90 mile per hour range.

Consequently, while the applicant herein does not intend to be bound by any particular theory or principle operation, he believes that these particular vortices can be directed well past the rider and others similarly situated by the more upright, widened portion at the top of the shield, with a narrowed portion near the middle, as previously pointed out.

In addition, within a few inches of extension and/or uprightness, there is an almost amazing reduction in the noise and turbulence level encountered by riders behind these shields.

Figure 7:
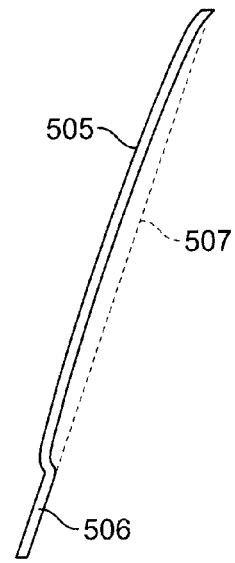
FIG. 7 is a vertical sectional view of a so-called double-bubble windshield.

Referring now to FIG. 7, it will be noted that the preferred form of shield shown in FIG. 4, for example, also has a generally raised portion 505 in the center part of the shield in relation to the prior art shields. This is sometimes referred to as a "double bubble" or shield having a bump or raised portion 505 of about 1 or 2 inches, for example.

Thus, in a replacement shield, the lower portion 506, including the outer margins 507, has the same contour as the original or OEM shield. The replacement shield, however, not only has its upper margins, particularly the widest part, wider than the original shield, but also has that portion raised by one to three inches, for example. Thus, considering the original shield to have a slightly corvex shape, the second portion has a slightly bulged or "double-bubble" shape. This feature is operable on movable or adjustable shields as well as fixed shields.

Referring now to the top view (FIG. 6) of the shield, it may be seen that more air will be deflected by a shield having the R-1 radius than one having the R-2 radius. The R-2 radius simply does not move the air stream as far as that of the R-1 radius. From the standpoint of FIG. 5, a steeper shield tends to a) deflect air farther above the rider, and b) cause more of the air to flow to the side, or the R-1 area.

Another optional feature is the provision of one or two strakes 501, 503 on the edge of the shield as shown in FIGS. 4 and 5. While some prior art shield have had formations such as wind deflectors on shields, the deflectors have had hinges with a generally vertical axis, while the strakes in this case are not movable, and have as an object the direction of air flow around the side of the shield rather than over the top.

It will thus be seen that the present invention provides a new and unusual configuration of windshields, having a number of advantages, including those pointed out herein and others which are inherent in the invention.

The invention claimed is:

1. A windshield for touring motorcycle, said windshield having a portion made at least in part from a transparent material and adapted to be seen through by a rider positioned behind said windshield, said windshield including a lower portion, an intermediate portion and an upper portion, said lower portion and said cycle having cooperating attachment means, said upper portion having a width greater than that of the intermediate portion, said width of said upper portion being at least 16 inches, said entire windshield being inclined from the vertical from 5° to no more than 20°, and, when viewed from the top, having a radius of curvature of at least 14 inches, said windshield being made at least in part from a plastic material.

2. A windshield as defined in claim 1 wherein said width of said upper portion is at least 18 inches.

3. A windshield as defined in claim 1 wherein said radius of curvature is at least 16 inches.

4. A windshield as defined in claim 1 wherein said width of said shield is from 16 to 26 inches.

5. A windshield as defined in claim 1 wherein said radius of curvature is from about 14 inches to about 24 inches.

6. A windshield as defined in claim 1 wherein said windshield is inclined from about 10° to about 15°.

7. A windshield as defined in claim 1 wherein said windshield is made from a material having an index of refraction from about 1.25 to about 1.50.

8. A windshield as defined in claim 1 wherein said windshield is made from a material having an index of refraction of about 1.30.

9. A windshield as defined in claim 1 wherein said windshield is made from a polycarbonate material.

10. A windshield as defined in claim 1 wherein said windshield includes at least one strake on each side portion of said shield.

11. A windshield as defined in claim 1 wherein said shield includes at least two strakes on each side portion of said shield.

12. A replacement windshield for touring motorcycle, said windshield having a portion made at least in part from a transparent polycarbonate resinous material and adapted to be seen through by a rider positioned behind said windshield, said windshield including a lower portion, an intermediate portion and an upper portion, said lower portion and said cycle having cooperating attachment means, said upper portion having a width greater than that of the intermediate portion, said width of said upper portion being at least 18 inches, said entire windshield being inclined from the vertical from 10° to no more than 25°, and, when viewed from the top, having a radius of curvature of at least 16 inches, said windshield having an upper portion extending forwardly of the original shield by at least one inch.

13. A replacement windshield as defined in claim 12 which includes at least one strake extending outwardly from each side portion of said shield.

* * * * *